United States Patent [19]

Brodie et al.

[11] Patent Number: 5,408,667

[45] Date of Patent: Apr. 18, 1995

[54] METHOD FOR UNIFIED DESIGN DOCUMENTATION

[75] Inventors: James J. Brodie, Phoenix; Robert C. Turner, Mesa; Jerry A. Toogood, Higley, all of Ariz.

[73] Assignee: Motorola, Inc., Schaumburg, Ill.

[21] Appl. No.: 93,573

[22] Filed: Jul. 19, 1993

[51] Int. Cl.6 ............................................. G06F 9/45
[52] U.S. Cl. .............................. 395/700; 364/DIG. 1; 364/280.4; 364/262.9
[58] Field of Search ......................................... 395/700

[56] References Cited

U.S. PATENT DOCUMENTS

| | | | |
|---|---|---|---|
| 4,860,203 | 8/1989 | Corrigan et al. | 364/DIG. 1 |
| 5,101,491 | 3/1992 | Katzeff | 364/DIG. 1 |
| 5,247,693 | 9/1992 | Bristol | 364/DIG. 1 |
| 5,265,254 | 11/1993 | Blasciak et al. | 395/700 |

OTHER PUBLICATIONS

"Using FrameMaker", Frame Technology Corporation, Part. No. 41-00321-00, Oct. 1989, pp. 1-26 to 2-5.
Lichtman, "Self-Documenting Macros", IBM Tech. Discl. Bull., vol. 15, No. 7, Dec. 1972, pp. 2153-2155.
Parrott, "Computer Program Documentation", IBM Tech. Discl. Bull., vol. 24, No. 12, May 1982, p. 6540.
Robert Turner, "A Program Documentation Tool", Motorola, Inc. Technical Developments, vol. 17, pp. 87-89, Dec. 1992.

Primary Examiner—Thomas M. Heckler
Attorney, Agent, or Firm—Gary W. Hoshizaki

[57] ABSTRACT

A method for unified design documentation includes capturing design information in a computer file and adding implementation code to the computer file. The implementation code is marked to distinguish it from the design information in the computer file. The implementation code is then extracted from the computer file and compiled into a prototype.

6 Claims, 1 Drawing Sheet

METHOD FOR UNIFIED DESIGN DOCUMENTATION

BACKGROUND OF THE INVENTION

The present invention relates, in general, to design documentation, and more particularly to a method for maintaining design documentation together with software source code.

Development of a complex system typically proceeds in a hierarchical fashion from a general top level overview of the problem addressed through layers of more and more specific information until final design documentation is generated. Typically the highest level of documentation is a text description which defines the desired functionality of the system being designed. The text description is refined by adding diagrams, flow charts, block diagrams, and further text to provide layers of increasing detail until the system being designed is completely and explicitly defined.

The system may be implemented as entirely software, entirely as a new apparatus, or as a combination of apparatus together with controlling software. Typically the hardware portion is described using a hardware design language such as the well known VHSIC Hardware Design Language (VHDL) which can be automatically processed to produce working hardware. Similarly software can be described in terms of a high level object oriented language such as C++. The computer system which uses a language translator to compile the source language code into a computer program which is run on a computer system of some sort. For either type of design, and especially for designs which involve a hybrid of hardware and software, refinements and changes to the desired functionality must be made as the design proceeds. In addition, various design decisions must be documented for future reference. Typically this has been accomplished by use of a mechanism such as a comment field embedded within the source code of the language. A region of text is delineated in some fashion and passed to the language translator. Since the comment text is part of a comment, it is ignored as the language translator generates the executable form of the program. The language translator must be able to determine the start and end of comments so as to ignore the appropriate text. Each programming language defines a mechanism to accomplish this, typically by reserving one or more characters to delineate the comments. Accordingly text within a comment is limited to a predefined set of allowable characters. As a result information such as graphics, sound, and complex data structures cannot be conveniently included within a comment.

Typically more extensive design information was kept in separate files and called "documentation". Documentation is a written record of the problem definition and details about implementation in hardware and software. As the program changes over time the documentation must also be changed. Inaccurate or out of date documentation confuses or misdirects the developer causing inaccurate modifications and schedule overruns. Keeping the documentation in a separate file from the program itself often caused the developer to overlook revising the documentation when the program was changed.

One solution to this problem was to include the documentation into the same file as the program source code as a form of extended comment. One technique for accomplishing this is found in the paper titled "A PROGRAM DOCUMENTATION TOOL" by Robert Turner, pp. 87-89 of Technical Developments, Vol. 17, December 1992 published by Motorola, Inc., which is incorporated herein by reference made thereto. This paper describes a method for including documentation as comments into a source (program) file. The documentation is extracted from the source by a documentation extraction process and reformatted into a human readable form.

This method is limited in handling documentation for two reasons. In a typical design, the documentation is created before the source files. The documentation then guides and directs the developer in creating the source files. The described method requires the combining of the documentation into source files after the source file has been at least partially completed. This sequence readily leads to inaccurate or out of date documentation as before.

The second limitation is caused by the limited nature of the structure of a program source file. Documentation takes the form of text with different sizes and fonts, graphics, tables of contents, indexes, pictures, and even sound to capture the designer's thoughts and ideas. A source program file is limited to simple text files. In order to incorporate documentation in its varied forms, several complex functions are required to transform documentation into simple text files. Documentation transformed into a simple text file may include the marker text causing the language translators to try and parse the documentation as actual program language. Alternatively because of length, the encoded documentation may overflow the computer language translate program.

Another problem not addressed by the described method is encoding of the documentation. The process of encoding the documentation hinders the development process. As the developer is trying to create the hardware description language or program source file, the documentation that describes what should be done has been encoded losing most if not all of its use to the designer. This encoded documentation is little more than gibberish and complicates the developer's authoring process rather than aiding.

Such a method is inherently limited in handling all of the information generated by the documentation process. This information includes such things as text of different sizes and fonts, graphics, tables of contents, indexes, pictures, and even sound so as to better capture the programmer's thoughts and ideas. There is a need for a program documentation tool which allows free incorporation of any type of documentation into a single file such that the documentation in whatever form required can be modified along with the source code which actually generates the program. Such a method should include the capability for using such tools as data flow diagrams and their associated properties, allow incorporation of multiple programs within a single file, and preferably allow incorporation of fragments of programs in whatever order is convenient for documentation rather than that required for a language translator.

SUMMARY OF THE INVENTION

A method for unified design documentation comprising capturing of design information in a computer file, adding implementation code to the computer file. Marking the implementation code in such a way as to distinguish the implementation code from the design information in the computer file. Extracting the implementation code from the computer file and compiling the implementation code into a prototype.

DETAILED DESCRIPTION OF THE PREFERRED EMBODIMENT

Figure 1:
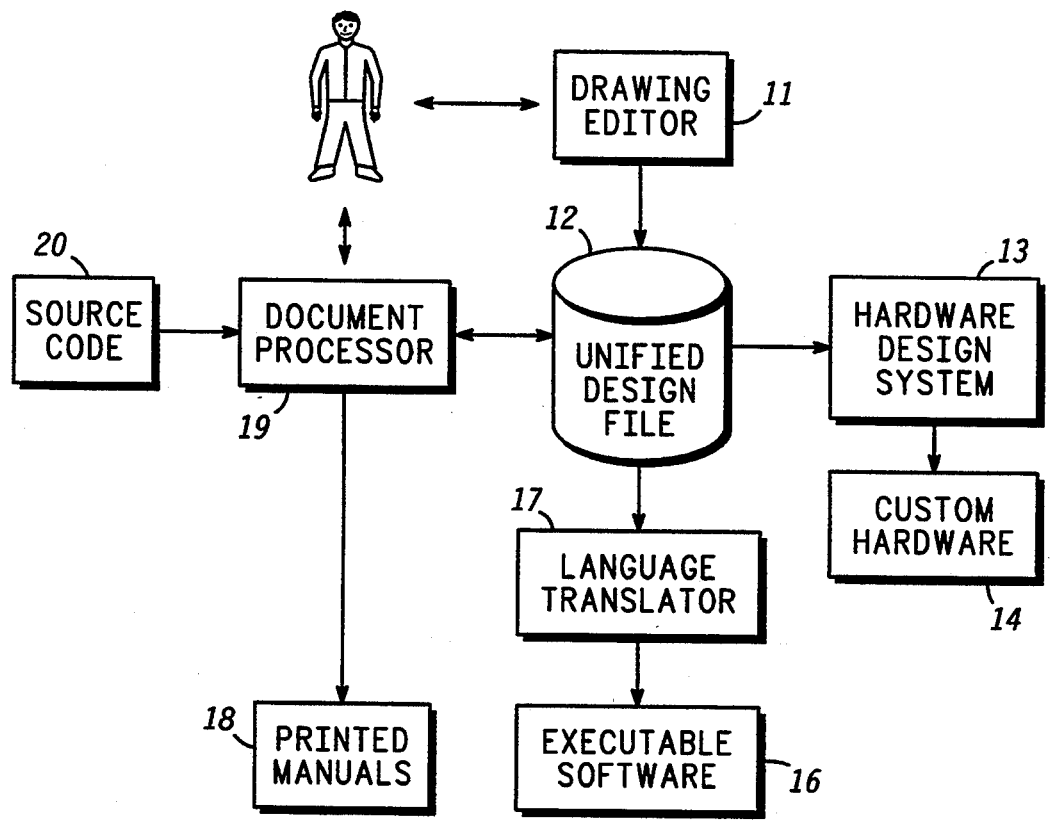
FIG. 1 shows a schematic drawing depicting a system for unified development documentation as a preferred embodiment in accordance with the present invention.

FIG. 1 shows a schematic diagram of a unified development documentation system as a preferred embodiment in accordance with the present invention. A unified design file 12 is used to store all information related to the object being designed. A drawing editor 11 that interfaces with a user is used to prepare schematic diagrams, data flow diagrams, system drawings and similar drawings which illustrate the functions and relationships of the component parts of the object being designed which are supplied to the unified design file 12. A document processor 19 which also interfaces with the user is used to capture descriptive text, to format and create printed manuals 18, and ultimately to create embedded source code 20. Typically document processor 19 can be also used to edit drawings entered with drawing editor 11, combining the drawings to product a set of printed manuals 18. Likewise source code 20 is embedded into the appropriate sections of printed manuals 18. When the design is ready for actual implementation, a hardware design system 13 extracts a detailed design description from unified design file 12. One typical method for coding the detailed design information related to custom hardware 14 is provided by such well known languages as the Electronic Design Interchange Format (EDIF) published as ANSI/EIA-548-1988 by the Electronic Industries Association, Washington D.C.; a second method uses the standard VHSIC Hardware Description Language as defined in "IEEE Standard VHDL Language Reference Manual", IEEE Inc., 1988. These standard languages allow the detailed design specifications of custom hardware to be expressed as a sequence of statements suited to automated design of actual hardware. Hardware design system 13 then creates custom tooling to produce the required custom hardware 14. Likewise source code intended to generate executable software 16 is extracted and then compiled by a language translator 17. Typically a high level computer programming language such as C++ is used for the software portion of the design.

Figure 2:
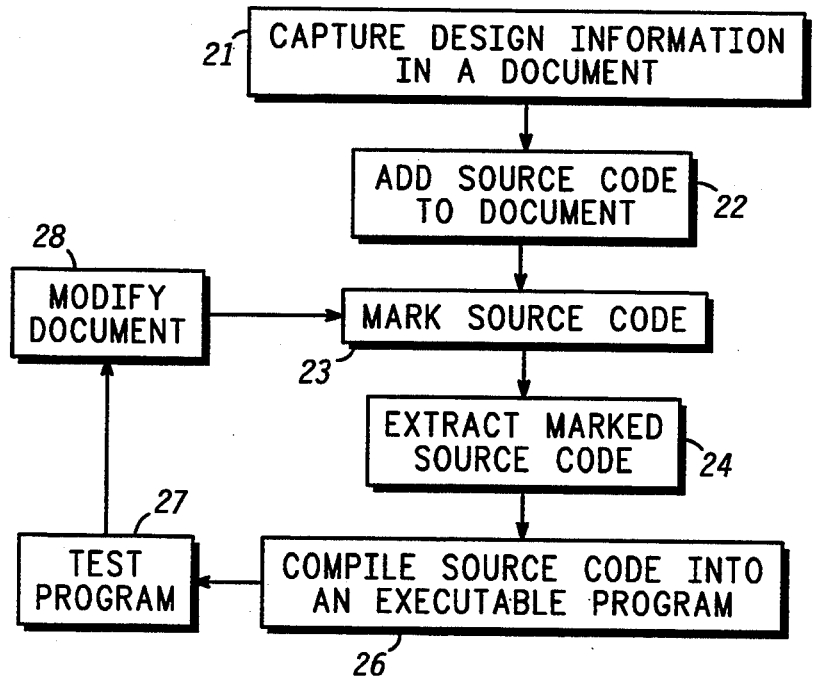
FIG. 2 shows a flow chart of a typical design and modification cycle as a preferred embodiment in accordance with the present invention.

FIG. 2 shows a flow chart illustrating typical steps required for unified development documentation as a preferred embodiment in accordance with the present invention. Step 21 comprises design information being captured in a document by document processor 19 (FIG. 1), and drawing editor 11 (FIG. 1). The document is stored in unified design file 12 (FIG. 1). The design proceeds in accordance with the selected design methodology which is appropriate for the object being designed. Typically this comprises a functional specification which defines in detail the required functionality of the object. Typically a hierarchical structure of progressive refinement and functionality is used in which the document progresses from a single very high level description or "mission statement" with little detail to numerous modules with each nodule having very specific and very detailed functions. Once the functional specification is completed actual design implementation begins. In the preferred embodiment source code 20 (FIG. 1) is added 22 to each module within the document. Source code 20 comprises a set of statements from a programming language which implement the functions of a single module as a piece of software or a hardware component. Source Code 20 is marked 23 to distinguish it from the other components of the documentation such as drawings, text, sound recordings, and the like. When source code 20 is complete enough to test, it is extracted 24 from unified design file 12 (FIG. 1) and used to create a file suited for input to language translator 17 (FIG. 1). Language translator 17 compiles 26 the source code into an executable computer program. The computer program is then tested 27 to determine if the computer program functions in accordance with the functional specification created earlier. If a deficiency is found, source code 20 within unified design file 12 is modified 28. Since both source code 20 and the related documentation both reside in unified design file 12, appropriate modifications are easily made to the documentation at the same time. The modified documentation and source code 20 are added to unified design file 12 and marked 23 as before. Hardware definition statements are extracted and used to develop prototypes of custom hardware 14 using hardware design system 13. When deficiencies are found the documentation and hardware definition statements are revised in much the same way as software related statements.

An alternative embodiment in accordance with the present invention uses a sequence code to mark the source code from other documentation. The sequence code allows source code 20 to be located in any order within unified design file 12 (FIG. 1). In this embodiment source code 20 is located with the functional specification which it implements rather than being stored in the order required to produce a properly functioning program. During extraction 24 the statements comprising source code 20 are arranged in the correct order to produce the desired function as indicated by the master codes.

By now it should be clear that the present invention provides a method for capturing and modifying both source code and documentation is a single step and a single file much facilitating the process of revising both. The method includes the capability for using such tools as data flow diagrams and their associated properties, allows incorporation of multiple programs within a single file, and allows incorporation of fragments of programs in whatever order is convenient for documentation rather than the order required for a language translator.

We claim:

1. A computer implemented method for unified design documentation, comprising:
    capturing design information in a computer file;
    adding implementation code to the computer file;
    marking the implementation code in such a way as to distinguish the implementation code from the design information in the computer file;
    extracting the implementation code from the computer file; and
    compiling the implementation code into a prototype.

2. The method for unified design documentation of claim 1, further comprising:
   testing the prototype; and
   modifying the implementation code in the computer file based on the prototype tests.

3. The method for unified design documentation of claim 1, wherein the implementation code comprises source code for a computer program, and the prototype comprises a computer executable version of the computer program.

4. The method for unified design documentation of claim 1, wherein the implementation code comprises a plurality of hardware description language statements suited for automated design of an apparatus and the prototype comprises the apparatus designed from the plurality of hardware description language statements.

5. A computer implemented method for unified design documentation, comprising:
   creating a computer readable file containing a functional description of a computer program;
   adding a plurality of source code statements to the computer readable file;
   marking the source code statements so as to distinguish the source code statements from the functional description of the computer program;
   extracting the source code statements from the file;
   placing the source code statements in a source code file; and
   compiling the source code file into an executable computer program.

6. A computer implemented method for unified design documentation, comprising:
   creating a file in a computer memory which contains a functional description of a desired computer program;
   adding a plurality of source code statements to the file in the computer memory which will implement the functions of the desired computer program after compilation;
   marking the plurality of source code statements so as to distinguish the plurality of source code statements from the functional description of the desired computer program and in such a way that the ordering of statements required for compilation can be reconstructed;
   extracting the source code statements from the file;
   placing the source code extracted from the file into a source code file;
   reordering the source code statements in the correct order for compilation;
   compiling the source code statements in the source code file into an executable computer program;
   testing the functionality of the executable computer program; and
   performing the above steps using a computer system.

* * * * *